(12) United States Patent
Saez et al.

(10) Patent No.: US 11,034,024 B2
(45) Date of Patent: Jun. 15, 2021

(54) FIXTURELESS COMPONENT ASSEMBLY

(71) Applicant: GM Global Technology Operations LLC, Detroit, MI (US)

(72) Inventors: Miguel A. Saez, Clarkston, MI (US); John P. Spicer, Plymouth, MI (US); Richard Skurkis, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 151 days.

(21) Appl. No.: 16/277,374

(22) Filed: Feb. 15, 2019

(65) Prior Publication Data

US 2020/0262078 A1 Aug. 20, 2020

(51) Int. Cl.
| | | |
|---|---|---|
| B25J 9/16 | (2006.01) | |
| B25J 9/00 | (2006.01) | |
| B23K 26/03 | (2006.01) | |
| B23K 37/04 | (2006.01) | |

(52) U.S. Cl.
CPC ........... *B25J 9/1682* (2013.01); *B23K 26/032* (2013.01); *B23K 37/0452* (2013.01); *B25J 9/0084* (2013.01); *B25J 9/1697* (2013.01); *B23K 37/0443* (2013.01); *G05B 2219/37572* (2013.01); *G05B 2219/39131* (2013.01)

(58) Field of Classification Search
CPC ...... B23K 37/047; B23K 37/04; B25J 9/1682; B25J 9/16; B25J 9/00
See application file for complete search history.

(56) References Cited

U.S. PATENT DOCUMENTS

| | | | | |
|---|---|---|---|---|
| 2015/0114241 | A1* | 4/2015 | Kinson | B65H 29/12 101/228 |
| 2015/0336271 | A1* | 11/2015 | Spicer | B25J 9/1687 428/195.1 |
| 2015/0343640 | A1* | 12/2015 | Shi | B25J 9/1697 382/153 |
| 2016/0325386 | A1* | 11/2016 | Farah | B23K 37/047 |
| 2018/0126553 | A1* | 5/2018 | Corkum | B25J 9/1697 |
| 2018/0376580 | A1* | 12/2018 | Xing | H03H 1/0007 |

FOREIGN PATENT DOCUMENTS

| | | |
|---|---|---|
| DE | 102004021388 A1 | 12/2005 |
| DE | 102004049332 A1 | 4/2006 |
| DE | 102012112025 B4 | 6/2014 |
| DE | 102016114863 A1 | 2/2017 |
| DE | 102016116404 A1 | 3/2017 |
| EP | 2227356 B1 | 9/2010 |
| EP | 2824526 A2 | 1/2015 |

\* cited by examiner

*Primary Examiner* — Kira Nguyen

(57) ABSTRACT

A method of assembling a plurality of subcomponents to form a finished component comprises gripping a first subcomponent with a first end-of-arm tool, wherein the first end-of-arm tool is attached to a first robot arm and grasping a second subcomponent with a second end-of-arm tool, wherein the second end-of-arm tool is attached to a second robot arm. Moving the first and second end-of-arm tools to position the first subcomponent relative to the second subcomponent in a pre-assembly position and then moving the first and second end-of-arm tools to engage interface surfaces of the first and second subcomponents. Forming a joint between the first subcomponent and the second subcomponent with a joining tool attached to a joining robot arm to thereby assemble the finished component.

19 Claims, 2 Drawing Sheets

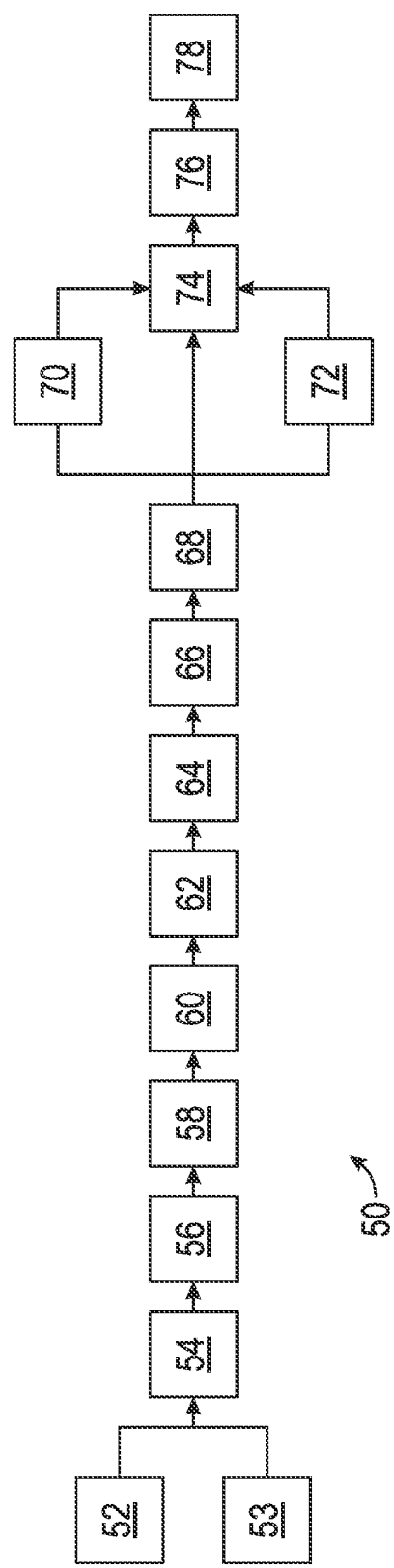

FIXTURELESS COMPONENT ASSEMBLY

INTRODUCTION

The present disclosure relates to a fixtureless component assembly system and to a method of assembling a component.

A manufacturing system typically moves, transforms, or operates on parts, subassemblies, and/or assemblies that must be accurately located and held in place for manufacturing and assembly operations. For example, a sheet metal part or steel plate, subassembly, or assembly may need to be accurately located and held in place to conduct assembly, welding, and inspection operations in a vehicle assembly plant or along an assembly line for items such as appliances, aircraft, furniture, and electronics. Part locating fixtures are normally used for this purpose.

Part locating fixtures typically include a plurality of fixed pins that are configured to fit into a plurality of locating holes defined by a part, and one or more clamps that are configured to hold the part in place. Part locating fixtures are generally useable for only one particular part size and/or shape and usually need to be modified or rebuilt to locate and hold a differently sized and/or shaped part. Multiple part locating fixtures are typically required for the wide variety of parts and the wide variety of assembly and manufacturing operations in a manufacturing plant. Thus, while current systems achieve their intended purpose, there is a need for a new and improved system and method for assembling a component, and more particularly to assemble a component using a fixtureless component assembly system.

SUMMARY

According to several aspects of the present disclosure, a method of assembling a plurality of subcomponents to form a finished component comprises gripping a first subcomponent with a first end-of-arm tool, wherein the first end-of-arm tool is attached to a first robot arm, and grasping a second subcomponent with a second end-of-arm tool, wherein the second end-of-arm tool is attached to a second robot arm. Moving the first and second end-of-arm tools to position the first subcomponent relative to the second subcomponent in a pre-assembly position and then moving the first and second end-of-arm tools to engage interface surfaces of the first and second subcomponents. Using a camera to visually locate the interface surfaces on the first and second subcomponents and estimating an off-set between the pre-assembly position and a required assembly position. Moving the first and second end-of-arm tools to engage interface surfaces of the first and second subcomponents, and moving the first and second subcomponents to the required assembly position. Measuring torque forces and lateral forces placed on the first and second subcomponents by the first and second end-of-arm tools with sensors mounted on the first and second end-of-arm tools, and establishing when the first and second subcomponents are in the required assembly position based on the torque forces and lateral forces. Scanning the first and second subcomponents locating assembly datums with a non-contact measuring device, and comparing the position of the first and second subcomponents to the required assembly position.

According to another aspect of the present disclosure, the method further comprises, after comparing the position of the first and second subcomponents to the required assembly position, forming a joint between the first subcomponent and the second subcomponent with a joining tool attached to a joining robot arm to thereby assemble the finished component.

According to another aspect of the present disclosure, the method further comprises, after forming a joint between the first subcomponent and the second subcomponent with a joining tool attached to a joining robot arm to thereby assemble the finished component; scanning the finished component to verify geometry.

According to another aspect of the present disclosure, the method further comprises, after scanning the first and second subcomponents and locating assembly datums with a non-contact measuring device, and comparing the position of the first and second subcomponents to the required assembly position, moving the first and second subcomponents to the required assembly position within established tolerances.

According to another aspect of the present disclosure, the method further comprises, after scanning the first and second subcomponents and locating assembly datums with a non-contact measuring device, and comparing the position of the first and second subcomponents to the required assembly position, moving the first and second subcomponents to a thermal distortion compensation position.

According to another aspect of the present disclosure, the method further comprises, after scanning the finished component to verify geometry, moving the first and second robot arms and plastically deforming the finished component.

According to another aspect of the present disclosure, locating the interface surfaces on the first and second subcomponents further includes, using a fixed camera to visually locate the interface surfaces on the first and second subcomponents.

According to another aspect of the present disclosure, locating the interface surfaces on the first and second subcomponents further includes, moving a camera mounted onto an inspection robot arm to an inspection position, and using the camera to visually locate the interface surfaces on the first and second subcomponents.

According to another aspect of the present disclosure, the method further comprises, grasping a third subcomponent with a third end-of-arm tool, wherein the third end-of-arm tool is attached to a third robot arm. Moving the third end-of-arm tool to position the third subcomponent relative to the first and second subcomponents in a pre-assembly position. Using a camera to visually locate the interface surfaces on the third subcomponent and estimating an off-set between the pre-assembly position and a required assembly position. Moving the third end-of-arm tools to engage interface surfaces of the first, second and third subcomponents. Moving the third subcomponent to the required assembly position, measuring torque forces and lateral forces placed on the third subcomponent by the third end-of-arm tools with sensors mounted on the third end-of-arm tool, and establishing when the third subcomponent is in the required assembly position based on the torque forces and lateral forces. Scanning the third subcomponent and locating assembly datums with a non-contact measuring device, and comparing the position of the third subcomponent to the required assembly position.

In another aspect of the present disclosure, the method further comprises, after comparing the position of the first, second and third subcomponents to the required assembly position; forming a joint between the first subcomponent and the second subcomponent with a joining tool attached to a joining robot arm and forming a joint between the second subcomponent and the third subcomponent with a joining tool attached to a joining robot arm to thereby assemble the finished component.

According to several aspects of the present disclosure, a fixtureless component assembly system comprises a first robot arm having a first end-of-arm tool mounted thereon and adapted to grasp a first subcomponent, a second robot arm having a second end of arm tool mounted thereon and adapted to grasp a second subcomponent, and a system controller adapted to control the first and second robot arms and first and second end-of-arm tools to position the first and second subcomponents relative to one another. An inspection camera is in communication with the system controller and adapted to visually locate interface surfaces on the first and second subcomponents, wherein the system controller estimates an off-set between a pre-assembly position and a required assembly position. Sensors are mounted on the first and second end-of-arm tools and adapted to measure torque forces and lateral forces placed on the first and second subcomponents by the first and second end-of-arm tools as the first and second end-of-arm tools move the first and second subcomponents to the required assembly position.

According to another aspect of the present disclosure, the fixtureless component assembly system further comprises a joining robot arm having a joining tool mounted thereon, wherein the system controller controls the joining robot arm to bring the joining tool into engagement with the first and second subcomponents and join the first and second subcomponents to one another.

According to another aspect of the present disclosure, the joining tool is a welding tool adapted to weld the first subcomponent to the second subcomponent.

According to another aspect of the present disclosure, the first and second robot arms are adapted to be controlled by the system controller based on one of position control, wherein the position of the first and second robot arms is controlled based on the three dimensional position of the robot arm within a given space, and force control, wherein the position of the first and second robot arms is controlled based on the forces placed on the first and second end-of-arm tools by the first and second robot arms as measured by the first and second force gauges.

According to another aspect of the present disclosure, the inspection camera is a mounted at a fixed position.

According to another aspect of the present disclosure, the inspection camera the inspection camera is mounted onto an inspection robot arm, wherein the inspection robot arm is adapted to move the inspection camera to an inspection position to visually locate the interface surfaces on the first and second subcomponents.

According to another aspect of the present disclosure, the fixtureless component assembly system further comprises a third robot arm having a third end-of-arm tool mounted thereon and adapted to grasp a third subcomponent. Wherein, the system controller is further adapted to control the third robot arm and the third end-of-arm tool to position the third subcomponent relative to the first and second subcomponents, the inspection camera is further adapted to visually locate interface surfaces on the third subcomponent, and the system controller estimates an off-set between a pre-assembly position and a required assembly position, and sensors are mounted on the third end-of-arm tool and are adapted to measure torque forces and lateral forces placed on the third subcomponent by the third end-of-arm tool as the third end-of-arm tool moves the third subcomponent to the required assembly position.

According to another aspect of the present disclosure, the fixtureless component assembly system further comprises a joining robot arm having a joining tool mounted thereon, wherein the system controller controls the joining robot arm to bring the joining tool into engagement with the first, second and third subcomponents and joins the first, second and third subcomponents to one another.

According to another aspect of the present disclosure, the system controller is adapted to moves the first, second and third end-of-arm tools to the required assembly position based on the torque forces and lateral forces measured by the sensors on the first, second and third end-of-arm tools compared against reference force targets.

According to another aspect of the present disclosure, the first and second robot arms are adapted to exert forces onto the first and second subcomponents to distort the first and second subcomponents to a thermal distortion compensation position prior to joining the first, second and third subcomponents, and to exert forces onto the first and second subcomponents to plastically deform the finished component after the first and second subcomponents are joined.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a schematic flowchart of a method of assembling a component according to an exemplary embodiment.

DETAILED DESCRIPTION

Figure 1:
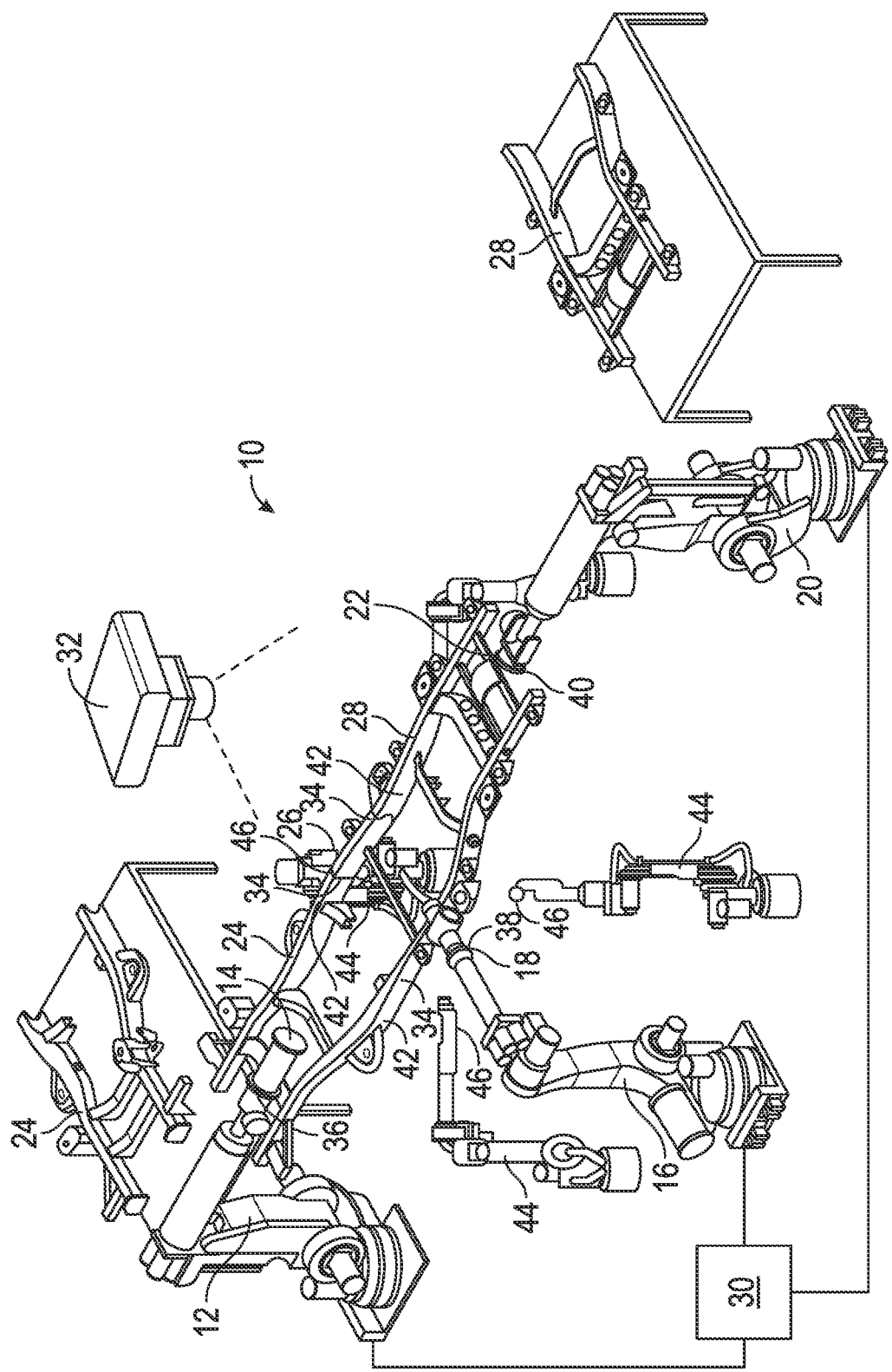
FIG. 1 is a perspective view of the fixtureless component assembly system according to an exemplary embodiment.

The following description is merely exemplary in nature and is not intended to limit the present disclosure, application, or uses.

Referring to FIG. 1, a fixtureless component assembly system of the present disclosure is shown generally at 10. The component assembly system 10 comprises a first robot arm 12 with a first end-of-arm tool 14 mounted thereon, a second robot arm 16 with a second end-of-arm tool 18 mounted thereon, and a third robot arm 20 with a third end-of-arm tool 22 mounted thereon. The first end-of-arm tool 14 is adapted to grasp a first subcomponent 24 and hold the first subcomponent 24 during the assembly process. The second end-of-arm tool 18 is adapted to grasp a second subcomponent 26 and hold the second subcomponent 26 during the assembly process. The third end-of-arm tool 22 is adapted to grasp a third subcomponent 28 and hold the third subcomponent 28 during the assembly process.

The first, second and third subcomponents 24, 26, 28 may be, as a non-limiting example, a panel configured as a decklid or liftgate for an automotive vehicle. Alternatively, the first, second and third subcomponents 24, 26, 28 may be an aircraft fuselage panel, a door panel for a consumer appliance, an armrest for a chair, or any other subcomponent configured to be joined or attached to another subcomponent. The first, second and third subcomponents 24, 26, 28 may be formed from any suitable material, such as, metal, plastic, a composite, and the like. The first, second and third subcomponents 24, 26, 28 as shown in the exemplary embodiment of FIG. 1 are vehicle frame components for an automobile.

The first, second and third robot arms 12, 16, 20 may be a programmable mechanical arm, may include hand, wrist, elbow, and shoulder portions (not shown), and may be remotely-controlled by pneumatics and/or electronics. The first, second and third robot arms 12, 16, 20 may be, as non-limiting examples, a six-axis articulated robot arm, a Cartesian robot arm, a spherical or polar robot arm, a selective compliance assembly robot arm, and the like. In one non-limiting example, the first, second and third robot arms 12, 16, 20 may be a six-axis articulated robot arm.

A system controller 30 is adapted to control the first, second and third robot arms 12, 16, 20 and first, second and third end-of-arm tools 14, 18, 22. The system controller 30 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The system controller 30 moves the first, second and third robot arms 12, 16, 20 and actuates the first, second and third end-of-arm tools 14, 18, 22 to bring the first, second and third end-of-arm tools 14, 18, 22 to a position to grasp the first, second and third subcomponents 24, 26, 28 and bring the first, second and third end-of-arm tools 14, 18, 22 into position to properly position the first, second and third subcomponents 24, 26, 28 relative to each other. Movement of the first, second and third robot arms 12, 16, 20 by the system controller 30 is based on executable code stored in memory or provide to the system controller 30.

The fixtureless component assembly system 10 includes at least one inspection camera 32. The inspection camera visually locates interface surfaces 34, datums and identifying features on the first, second and third subcomponents 24, 26, 28. The inspection camera 32 communicates with the system controller 30. The system controller 30 uses information from the inspection camera to determine the position of the first, second and third subcomponents 24, 26, 28 relative to one another and to control the first, second and third robot arms 12, 16, 20 to move the first, second and third subcomponents 24, 26, 28 appropriately throughout the assembly process. The inspection camera 32 may be mounted at a stationary position within the system. Alternatively, the inspection camera 32 may be mounted onto an inspection robot arm, wherein the system controller 30 moves the inspection camera 32 to various positions relative to the first, second and third subcomponents 24, 26, 28.

A first force gauge 36 is mounted on the first end-of-arm tool 14 and is adapted to measure torque forces and lateral forces placed on the first subcomponent 24 by the first end-of-arm tool 14. A second force gauge 38 is mounted on the second end-of-arm tool 18 and is adapted to measure torque forces and lateral forces placed on the second subcomponent 26 by the second end-of-arm tool 18. A third force gauge 40 is mounted on the third end-of-arm tool 22 and is adapted to measure torque forces and lateral forces placed on the third subcomponent 28 by the third end-of-arm tool 22.

The first, second and third robot arms 12, 16, 20 are adapted to be controlled by the system controller 30 based either on position control or force control. When the system controller 30 is using position control, the first, second and third robot arms 12, 16, 20 are controlled based on the three-dimensional position of the first, second and third robot arms 12, 16, 20 within the work space of the component assembly system 10. When using position control, the first, second and third robot arms 12, 16, 20 are controlled to keep them in a specific position. When the system controller 30 is using force control, the first, second and third robot arms 12, 16, 20 are controlled based on the force feedback measured by the first, second and third force gauges 36, 38, 40.

When the first, second and third subcomponents 24, 26, 28 are pre-assembled, the first, second and third force gauges 36, 38, 40 send feedback to the system controller 30. The system controller 30 uses information from the first, second and third force gauges 36, 38, 40 to determine when the first, second and third subcomponents 24, 26, 28 are properly pre-assembled. In the exemplary embodiment shown in FIG. 1, the first, second and third subcomponents 24, 26, 28 engage one another by slip fit engagement. Portions of the second subcomponent 26 slide into receiving portions 42 of the first and third subcomponents 24, 28 in a slip fit engagement. As the first, second and third subcomponents 24, 26, 28 are engaged, frictional forces of the slip fit engagement are measured by the first, second and third force gauges 36, 38, 40. The system controller 30 uses force control and information from the first, second and third force gauges 36, 38, 40 to move the first, second and third robot arms 12, 16, 20 and force the first, second and third subcomponents 24, 26, 28 into split fit engagement with one another until the first, second and third subcomponents 24, 26, 28 are fully engaged based on the force measurements.

Additionally, it may be desirable to induce a pre-load on the first, second and third subcomponents 24, 26, 28 to counter anticipated thermal distortion during welding. Welding of the first, second and third subcomponents 24, 26, 28 will create thermal expansion and deformation of the first, second and third subcomponents 24, 26, 28. In order to counter this, the first, second and third robot arms 12, 16, 20 can exert additional torque forces and lateral forces onto the first, second and third subcomponents 24, 26, 28 before welding begins. For example, it may be desirable to induce a pre-load or bend in the pre-assembled first, second and third subcomponents 24, 26, 28 before welding. A bend without plastic deformation will induce a pre-load in the finished component. When the weld is complete and the finished component is removed, the finished component will react in a predictable manner to the newly formed weld between the first, second and third subcomponents 24, 26, 28.

During the welding process, the system controller 30 can be used to vary the torque forces and lateral forces being applied to the first, second and third subcomponents 24, 26, 28. In this way, the forces applied to the first, second and third subcomponents 24, 26, 28 can be carefully controlled in reaction to the thermal expansion, thermal distortion, or other reactions to the welding process as the welding process is taking place. Ultimately, control of the position of the first, second and third subcomponents 24, 26, 28 relative to one another and control of the forces applied to the first, second and third subcomponents 24, 26, 28 while the first, second and third subcomponents 24, 26, 28 are being welded together allows the final shape and material characteristics of the finished component to be controlled.

A joining robot arm 44 includes a joining tool 46 mounted thereon. The joining tool 44 is adapted to join the first, second and third subcomponents 24, 26, 28. The joining robot arm 44 is controlled by the system controller 30 to bring the joining tool 46 into engagement with the first, second and third subcomponents 24, 26, 28. The joining robot arm 44 may be a programmable mechanical arm, may include hand, wrist, elbow, and shoulder portions (not shown), and may be remotely-controlled by pneumatics and/or electronics. The joining robot arm 44 may be, as non-limiting examples, a six-axis articulated robot arm, a Cartesian robot arm, a spherical or polar robot arm, a selective compliance assembly robot arm, and the like. In one non-limiting example, the joining robot arm 30 may be a six-axis articulated robot arm.

It should be understood that the joining tool 46 can be any type of joining tool appropriate for joining subcomponents of different materials and characteristics. In the exemplary embodiment shown in FIG. 1, the joining tool 46 is a welding tool adapted to create a welded attachment of the first, second and third subcomponents 24, 26, 28. In addition, multiple joining robot arms 44 may be used. In the exemplary embodiment shown in FIG. 1, the fixtureless component assembly system includes three substantially identical joining robot arms 44 having joining tools 46 mounted thereon to join the first, second and third subcomponents at various locations.

Referring to FIG. 2, a method of assembling a component is shown generally at 50. A method of assembling a finished component with the component assembly system 10 includes grasping 52 the first subcomponent 24 with the first end-of-arm tool 14, grasping 52 the second subcomponent 26 with the second end-of-arm tool 18, and grasping 52 the third subcomponent 28 with the third end-of-arm tool 22. After grasping 52 the first, second and third subcomponents 24, 26, 28 the first, second and third robot arms 12, 16, 20 move 54 the first, second and third end-of-arm tools 14, 18, 22 to a pre-assembly position. At the pre-assembly position, the first, second and third subcomponents 24, 26, 28 are in close proximity to one another, but have not been engaged with one another.

After the first, second and third subcomponents 24, 26, 28 are brought to the pre-assembly position the inspection camera 32 visually locates 56 the interface surfaces 34 on the first, second and third subcomponents 24, 26, 28. The inspection camera 32 communicates with the system controller 30. The system controller 30 uses the location of the interface surfaces 34 to estimate 58 an offset between the pre-assembly position, and the required assembly position. This estimate allows the system controller 30 to determine the movement necessary to further engage the first, second and third subcomponents 24, 26, 28.

After estimating the offset, the system controller articulates the first, second and third robot arms 12, 16, 20 to move 60 the first and second end-of-arm tools 14, 18, 22 to bring the interface surfaces 34 of the first, second and third subcomponents 24, 26, 28 into engagement. When the interface surfaces 34 of the first, second and third subcomponents 24, 26, 28 are engaged, the first, second and third force gauges 36, 38, 40 send feedback to the system controller 30. The system controller 30 moves 62 the first, second and third subcomponents 24, 26, 28 toward the required assembly position. As the first, second and third subcomponents are being moved toward the required assembly position, the first, second and third force gauges 36, 38, 40 measure 64 torque forces and lateral forces placed on the first, second and third subcomponents 24, 26, 28. The system controller 30 uses information from the first, second and third force gauges 36, 38, 40 to determine when the first, second and third subcomponents 24, 26, 28 are properly positioned at the required assembly position.

In the exemplary embodiment shown in FIG. 1, the first, second and third subcomponents 24, 26, 28 engage one another by slip fit engagement. Portions of the second subcomponent 26 slide into receiving portions 42 of the first and third subcomponents 24, 28 in a slip fit engagement. As the first, second and third subcomponents 24, 26, 28 are engaged, frictional forces of the slip fit engagement are measured by the first, second and third force gauges 36, 38, 40. The system controller 30 uses force control and information from the first, second and third force gauges 36, 38, 40 to move the first, second and third robot arms 12, 16, 20 and force the first, second and third subcomponents 24, 26, 28 into split fit engagement with one another until the first, second and third subcomponents 24, 26, 28 are fully engaged based on the force measurements.

When the system controller 30 determines that the first, second and third subcomponents 24, 26, 28 are positioned properly in the required assembly position, the inspection camera 32 scans 66 the first, second and third subcomponents 24, 26, 28 to visually locate assembly datums on the first, second and third subcomponents 24, 26, 28. The system controller 30 will use information from the inspection camera 32 to compare 68 the scanned position of the first, second and third subcomponents 24, 26, 28 to the required assembly position and verify that the first, second and third subcomponents 24, 26, 28 are positioned at the required assembly position within acceptable tolerances.

If the system controller 30 determines that the first, second and third subcomponents 24, 26, 28 are not properly located at the required assembly position, the first, second and third robot arms 12, 16, 20 will make an adjustment and move 70 the first, second and third subcomponents 24, 26, 28 to the required assembly position within established tolerances.

Additionally, it may be desirable to induce a pre-load on the first, second and third subcomponents 24, 26, 28 to counter anticipated thermal distortion during welding. Welding of the first, second and third subcomponents 24, 26, 28 will create thermal expansion and deformation of the first, second and third subcomponents 24, 26, 28. In order to counter this, the first, second and third robot arms 12, 16, 20 can exert additional torque forces and lateral forces onto the first, second and third subcomponents 24, 26, 28 before welding begins and move 72 the first, second and third subcomponents 24, 26, 28 to a thermal distortion compensation position. For example, it may be desirable to induce a pre-load or bend in the pre-assembled first, second and third subcomponents 24, 26, 28 before welding. A bend without plastic deformation will induce a pre-load in the finished component. When the weld is complete and the finished component is removed, the finished component will react in a predictable manner to the newly formed weld between the first, second and third subcomponents 24, 26, 28.

After the system controller 30 moves the first, second and third subcomponents 24, 26, 28 to the required assembly position, or possible the thermal distortion compensation position, a joint is formed 74 between the first subcomponent 24 and the second subcomponent 26 with the joining tool 46 attached to the joining robot arm 44. Additionally, a joint is formed 74 between the second subcomponent 26 and the third subcomponent 28 with the joining tool 46 attached to the joining robot arm 44.

It should be understood that the joining tool 46 can be any type of joining tool appropriate for joining subcomponents of different materials and characteristics. In the exemplary embodiment shown in FIG. 1, the joining tool 46 is a welding tool adapted to create a welded attachment of the first, second and third subcomponents 24, 26, 28. In addition, multiple joining robot arms 44 may be used. In the exemplary embodiment shown in FIG. 1, the fixtureless component assembly system includes three substantially identical joining robot arms 44 having joining tools 46 mounted thereon to join the first, second and third subcomponents at various locations.

During the welding 74 of the first, second and third subcomponents 24, 26, 28, the system controller 30 can vary the amount of forces applied to the first, second and third subcomponents 24, 26, 28 by each of the first, second and third robot arms 12, 16, 20 throughout the forming 74 of the joint.

After the first, second and third subcomponents 24, 26, 28 are welded together, the inspection camera scans 76 finished component to verify the final geometry of the finished component. Before scanning 76, the system controller will allow the first, second and third robot arms 12, 16, 20 to remove any forces applied to the first, second and third subcomponents 24, 26, 28. The system controller 30 will verify that the finished component has the proper geometry. If the geometry of the finished component needs to be adjusted, the system controller 30 can articulate the first, second and third robot arms 12, 16, 20 to induce forces onto the finished component to plastically deform 78 the finished component.

A component assembly system 10 of the present disclosure offers several advantages. Subcomponents can be assembled without using a dedicated fixture. Additionally, the subcomponents 16, 22 can be influenced by external forces prior to and during the welding process to create predictable thermal deformation and material characteristics. Finally, the component assembly system 10 of the present disclosure can perform as discussed above and is flexible to accommodate different typed of components and to vary the characteristics of the components formed therein.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of assembling a plurality of subcomponents to form a finished component, the method comprising:
    grasping a first subcomponent with a first end-of-arm tool, wherein the first end-of-arm tool is attached to a first robot arm;
    grasping a second subcomponent with a second end-of-arm tool, wherein the second end-of-arm tool is attached to a second robot arm;
    grasping a third subcomponent with a third end-of-arm tool, wherein the third end-of-arm tool is attached to a third robot arm;
    moving the first, second and third end-of-arm tools with a system controller adapted to control the first, second and third robot arms and first, second and third end-of-arm tools;
    positioning the first subcomponent, the second subcomponent and the third subcomponent relative to one another in a pre-assembly position;
    using an inspection camera that is in communication with the system controller to visually locate interface surfaces on the first, second and third subcomponents;
    using the system controller and estimating an off-set between the pre-assembly position and a required assembly position;
    actuating the first, second and third robot arms and moving the first, second and third end-of-arm tools to engage the interface surfaces of the first, second and third subcomponents;
    actuating the first, second and third robot arms and moving the first, second and third subcomponents to the required assembly position,
    measuring torque forces and lateral forces placed on the first, second and third subcomponents by the first, second and third end-of-arm tools with sensors mounted on the first, second and third end-of-arm tools, and establishing when the first, second and third subcomponents are in the required assembly position based on the torque forces and lateral forces;
    scanning the first, second and third subcomponents and locating assembly datums with a non-contact measuring device;
    comparing the position of the first, second and third subcomponents to the required assembly position;
    actuating the first, second and third robot arms and moving the first, second and third subcomponents to the required assembly position within established tolerances;
    actuating a joining tool attached to a joining robot arm and forming a joint between the first subcomponent and the second subcomponent, and actuating the joining tool and forming a joint between the second subcomponent and the third subcomponent to thereby assemble a finished component; and
    using the inspection camera and the system controller and scanning the finished component to verify geometry.

2. The method of claim 1, further comprising:
    after scanning the first, second and third subcomponents and locating assembly datums with a non-contact measuring device, and comparing the position of the first, second and third subcomponents to the required assembly position;
    actuating the first, second and third robot arms and moving the first, second and third subcomponents to a thermal distortion compensation position.

3. The method of claim 1, further comprising:
    after using the inspection camera and the system controller and scanning the finished component to verify geometry;
    actuating the first, second and third robot arms and moving the first, second and third end-of-arm tools and plastically deforming the finished component.

4. A fixtureless component assembly system comprising:
    a first robot arm having a first end-of-arm tool mounted thereon and adapted to grasp a first subcomponent;
    a second robot arm having a second end of arm tool mounted thereon and adapted to grasp a second subcomponent;

a third robot arm having a third end-of-arm tool mounted thereon and adapted to grasp a third subcomponent;

a system controller adapted to control the first, second and third robot arms and the first, second and third end-of-arm tools to position the first, second and third subcomponents relative to one another;

an inspection camera in communication with the system controller and adapted to visually locate interface surfaces on the first, second and third subcomponents, wherein the system controller estimates an off-set between a pre-assembly position and a required assembly position; and sensors mounted on the first, second and third end-of-arm tools and adapted to measure torque forces and lateral forces placed on the first, second and third subcomponents by the first, second and third end-of-arm tools as the first, second and third end-of-arm tools move the first, second and third subcomponents to the required assembly position.

5. The fixtureless component assembly system of claim 4, further comprising a joining robot arm having a joining tool mounted thereon, wherein the system controller controls the joining robot arm to bring the joining tool into engagement with the first and second subcomponents and join the first and second subcomponents to one another.

6. The fixtureless component assembly system of claim 5, wherein the joining tool is a welding tool adapted to weld the first subcomponent to the second subcomponent.

7. The fixtureless component assembly system of claim 5, wherein the first and second robot arms are adapted to exert forces onto the first and second subcomponents to distort the first and second subcomponents to a thermal distortion compensation position prior to joining the first, second and third subcomponents, and to exert forces onto the first and second subcomponents to plastically deform the finished component after the first and second subcomponents are joined.

8. The fixtureless component assembly system of claim 4, wherein the first and second robot arms are adapted to be controlled by the system controller based on one of position control, wherein the position of the first and second robot arms is controlled based on the three dimensional position of the robot arm within a given space, and force control, wherein the position of the first and second robot arms is controlled based on the forces placed on the first and second end-of-arm tools by the first and second robot arms as measured by the first and second force gauges.

9. The fixtureless component assembly system of claim 4, wherein the inspection camera is mounted at a fixed position.

10. The fixtureless component assembly system of claim 4, wherein the inspection camera is mounted onto an inspection robot arm, wherein the inspection robot arm is adapted to move the inspection camera to an inspection position to visually locate the interface surfaces on the first and second subcomponents.

11. The fixtureless component assembly system of claim 4, further comprising a joining robot arm having a joining tool mounted thereon, wherein the system controller controls the joining robot arm to bring the joining tool into engagement with the first, second and third subcomponents and joins the first, second and third subcomponents to one another.

12. The fixtureless component assembly system of claim 4, wherein the system controller is adapted to moves the first, second and third end-of-arm tools to the required assembly position based on the torque forces and lateral forces measured by the sensors on the first, second and third end-of-arm tools compared against reference force targets.

13. A fixtureless component assembly system comprising:
a first robot arm having a first end-of-arm tool mounted thereon and adapted to grasp a first subcomponent;

a second robot arm having a second end of arm tool mounted thereon and adapted to grasp a second subcomponent;

a system controller adapted to control the first and second robot arms and first and second end-of-arm tools to position the first and second subcomponents relative to one another;

an inspection camera in communication with the system controller and adapted to visually locate interface surfaces on the first and second subcomponents, wherein the system controller estimates an off-set between a pre-assembly position and a required assembly position;

sensors mounted on the first and second end-of-arm tools and adapted to measure torque forces and lateral forces placed on the first and second subcomponents by the first and second end-of-arm tools as the first and second end-of-arm tools move the first and second subcomponents to the required assembly position; and a joining robot arm having a joining tool mounted thereon, wherein the system controller controls the joining robot arm to bring the joining tool into engagement with the first and second subcomponents and join the first and second subcomponents to one another and the first and second robot arms are adapted to exert forces onto the first and second subcomponents to distort the first and second subcomponents to a thermal distortion compensation position prior to joining the first, second and third subcomponents, and to exert forces onto the first and second subcomponents to plastically deform the finished component after the first and second subcomponents are joined.

14. The fixtureless component assembly system of claim 13, further comprising:
a third robot arm having a third end-of-arm tool mounted thereon and adapted to grasp a third subcomponent;

wherein, the system controller is further adapted to control the third robot arm and the third end-of-arm tool to position the third subcomponent relative to the first and second subcomponents;

the inspection camera is further adapted to visually locate interface surfaces on the third subcomponent, and the system controller estimates an off-set between a pre-assembly position and a required assembly position; and sensors are mounted on the third end-of-arm tool and are adapted to measure torque forces and lateral forces placed on the third subcomponent by the third end-of-arm tool as the third end-of-arm tool moves the third subcomponent to the required assembly position.

15. The fixtureless component assembly system of claim 14, further comprising a joining robot arm having a joining tool mounted thereon, wherein the system controller controls the joining robot arm to bring the joining tool into engagement with the first, second and third subcomponents and joins the first, second and third subcomponents to one another.

16. The fixtureless component assembly system of claim 14, wherein the system controller is adapted to moves the first, second and third end-of-arm tools to the required assembly position based on the torque forces and lateral forces measured by the sensors on the first, second and third end-of-arm tools compared against reference force targets.

17. The fixtureless component assembly system of claim 13, wherein the first and second robot arms are adapted to be controlled by the system controller based on one of position control, wherein the position of the first and second robot arms is controlled based on the three dimensional position of the robot arm within a given space, and force control, wherein the position of the first and second robot arms is controlled based on the forces placed on the first and second end-of-arm tools by the first and second robot arms as measured by the first and second force gauges.

18. The fixtureless component assembly system of claim 13, wherein the inspection camera is mounted at a fixed position.

19. The fixtureless component assembly system of claim 13, wherein the inspection camera is mounted onto an inspection robot arm, wherein the inspection robot arm is adapted to move the inspection camera to an inspection position to visually locate the interface surfaces on the first and second subcomponents.

\* \* \* \* \*